(12) United States Patent
Dupay et al.

(10) Patent No.: US 6,252,497 B1
(45) Date of Patent: Jun. 26, 2001

(54) COUPLING ALIGNMENT WARNING SYSTEM

(75) Inventors: Steven C. Dupay; Randy L. Schutt, both of Holland, MI (US)

(73) Assignee: Holland Hitch Company, Holland, MI (US)

( * ) Notice: Subject to any disclaimer, the term of this patent is extended or adjusted under 35 U.S.C. 154(b) by 0 days.

(21) Appl. No.: 08/951,250

(22) Filed: Oct. 16, 1997

(51) Int. Cl.$^7$ .................................................. G08B 21/00
(52) U.S. Cl. ...................... 340/431; 250/206.1; 307/9.1; 340/435
(58) Field of Search .................................. 340/431, 435, 340/686, 903; 250/206.1, 222.1; 307/9.1, 10.1

(56) References Cited

U.S. PATENT DOCUMENTS

| | | | |
|---|---|---|---|
| 3,734,539 | 5/1973 | Salmi | 280/477 |
| 3,767,292 | 10/1973 | Rutkowski | 340/431 |
| 3,924,257 | 12/1975 | Roberts | 340/431 |
| 4,852,901 * | 8/1989 | Beasley et al. | 280/477 |
| 4,988,116 | 1/1991 | Eversten | 280/477 |
| 5,108,123 | 4/1992 | Rubenzik | 280/477 |
| 5,191,328 | 3/1993 | Nelson | 340/870.06 |
| 5,224,270 | 7/1993 | Burrus | 33/264 |
| 5,285,205 | 2/1994 | White | 340/932.2 |
| 5,455,557 * | 10/1995 | Noll et al. | 340/431 |
| 5,461,471 | 10/1995 | Sommerfeld | 356/3 |
| 5,513,870 | 5/1996 | Hickman | 280/477 |
| 5,530,421 | 6/1996 | Marshall et al. | 340/436 |
| 5,617,072 | 4/1997 | McNeal | 340/431 |
| 5,650,784 * | 7/1997 | McCullough | 340/431 |
| 5,729,194 * | 3/1998 | Spears et al. | 340/431 |

* cited by examiner

*Primary Examiner*—Daryl Pope
(74) *Attorney, Agent, or Firm*—Price, Heneveld, Cooper, DeWitt & Litton

(57) ABSTRACT

The coupling alignment warning system (CAWS) of the instant invention is designed to provide the driver of a towing unit, e.g., a commercial truck, with visual and/or audible cues that indicate whether the towing unit is aligned relative to a towed unit for proper engagement of the coupling components mounted thereon, including a fifth wheel hitch on the towing unit and a king pin on the trailer. The CAWS combines a laser light source and a series of sensors with a reflective target to provide alignment information to the user. In particular, the system combines a low-power laser diode mounted on the towing unit with a retro-reflective target that is attached, preferably temporarily, on the towed unit. The target will continuously return positive coupling alignment information back to the sensors as long as laser light impinges upon the target, i.e., as long as target acquisition is maintained. The sensors transmit detection signals to a processing unit that includes a microprocessor and relay. The microprocessor is programmed to calculate a threshold level of light that is based on sensed ambient light signals. In operation, the microprocessor decodes the detected light and determines whether the detected light level reaches the threshold level of light. If so, the CAWS indicates to the user that target acquisition has been achieved, and thus, that the towing unit is aligned with the towed unit for positive coupling. The microprocessor also controls the relay, thus controlling the delivery of power to the laser light source so that the system can continually compute an updated threshold level of light based on the ambient light in the surrounding operating environment. As a result, the system minimizes the chance of triggering on false light signals, notwithstanding varying ambient light conditions. The CAWS is particularly useful in zero or low visibility conditions because it can be used in conjunction with mirrors and external reference points to provide reliable position information to the user.

47 Claims, 8 Drawing Sheets

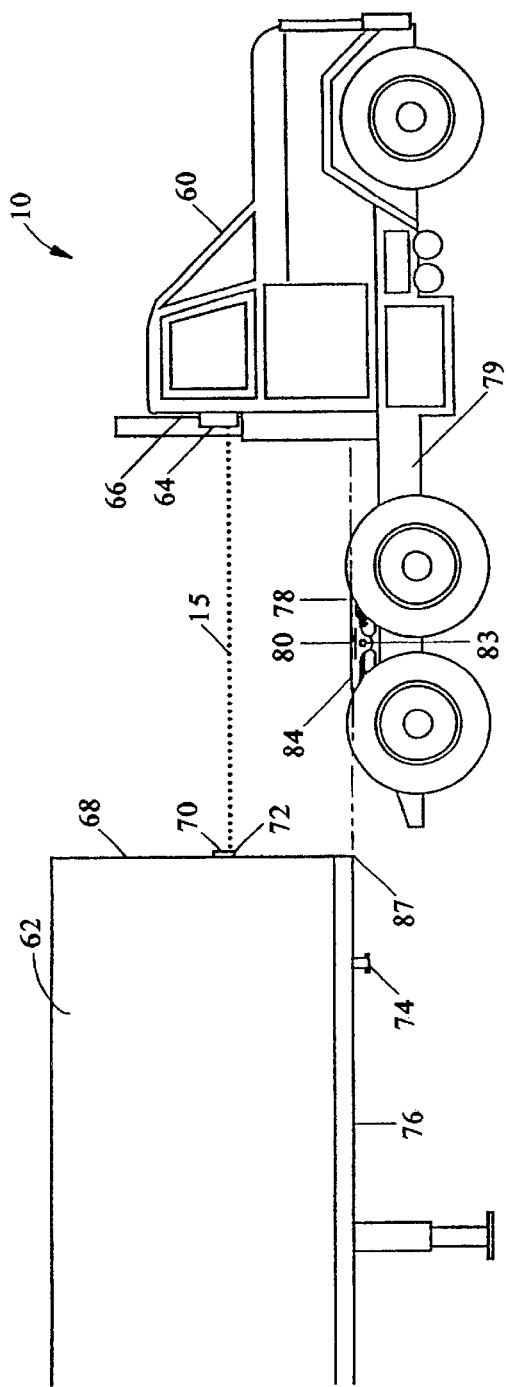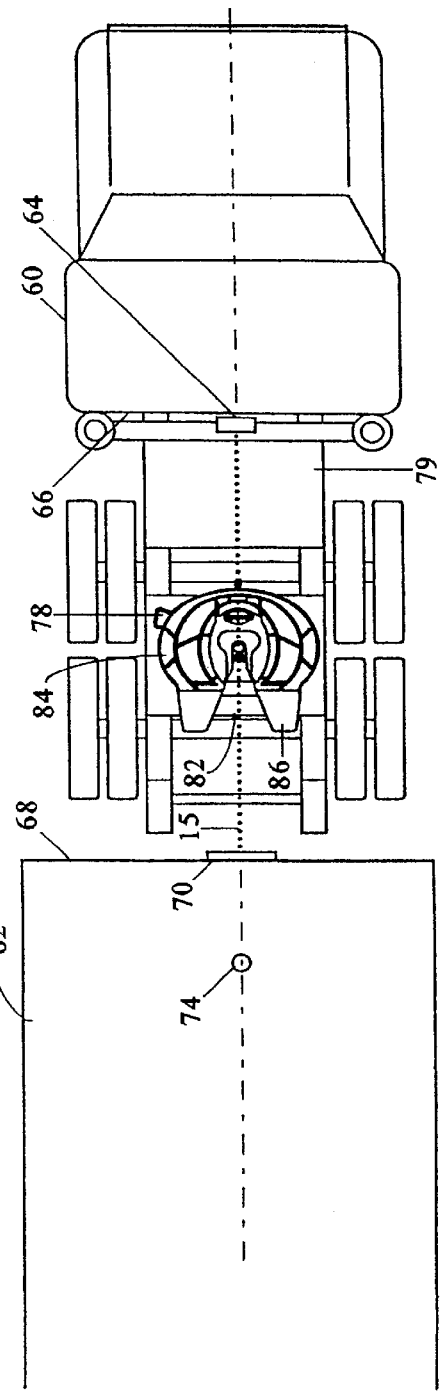

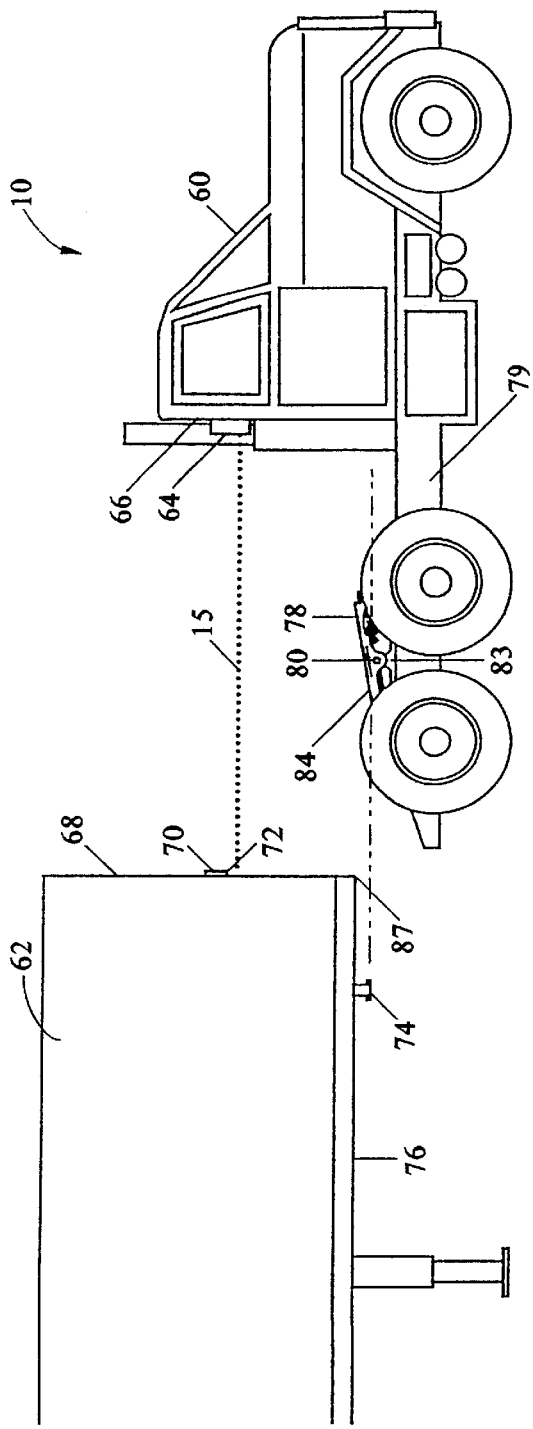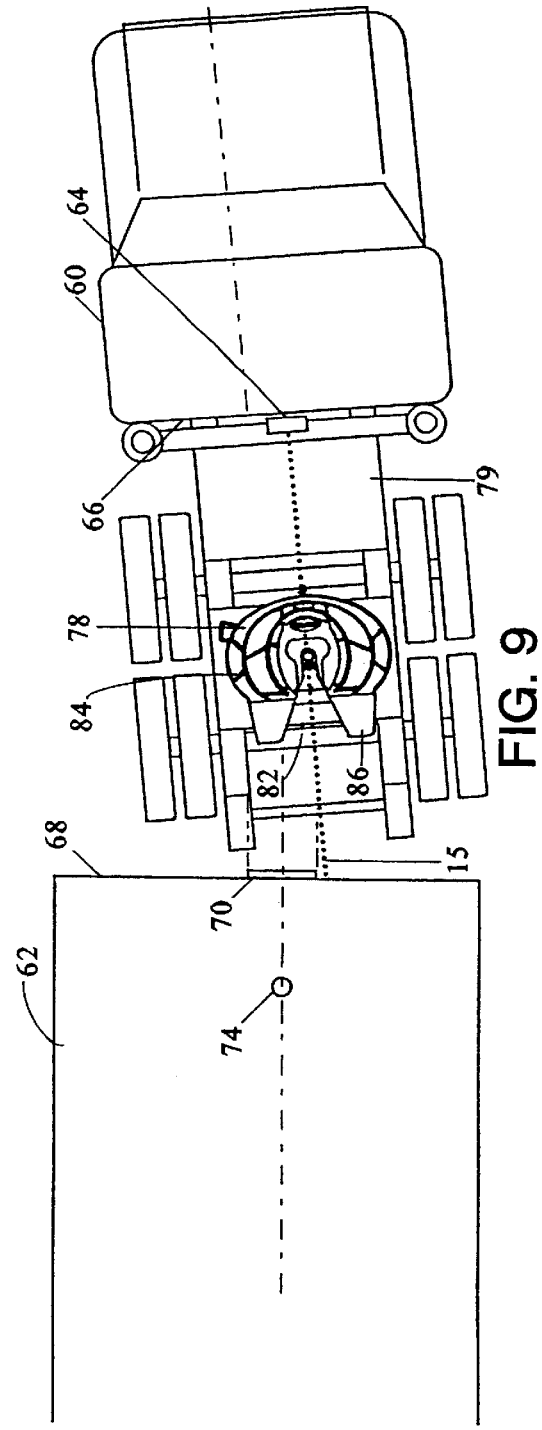

COUPLING ALIGNMENT WARNING SYSTEM

BACKGROUND OF THE INVENTION

1. Field of the Invention

The present invention relates to systems for aligning a towing unit with a towed unit, e.g., a trailer. In particular, the instant invention is adapted to assist the driver of the towing unit with aligning the fifth wheel hitch of a commercial truck and the king pin of a trailer to achieve positive coupling between the two, especially in zero or low visibility conditions.

2. Discussion of Related Art

To couple a vehicle, such as a commercial truck, to a trailer, the driver must continually estimate the position of the vehicle relative to the trailer while maneuvering the vehicle into alignment with the trailer. In practice, this may involve exiting the truck to determine the position of the truck relative to the trailer and then re-entering the truck to maneuver it into alignment. In addition, the driver utilizes his rearview side mirrors to approximate the lateral alignment between the truck and trailer, while vertical alignment is often judged only by "feel," or guess. Such practice often leads to high or low coupling and, possibly, lateral misalignment between the truck and the trailer, which can result in damage to the truck, trailer and/or the interlocking apparatus.

The interlocking apparatus is comprised of components on both the truck and the trailer which mate to achieve a mechanical connection. Typically, the truck is equipped with a locking assembly, known in the heavy trucking industry as a fifth wheel hitch, and an apparatus mounted to the trailer, known in the industry as a king pin. The king pin extends downwardly, perpendicular to the bolster plate to which it is attached, the bolster plate being mounted to the bottom surface of the trailer. The fifth wheel hitch includes a hitch plate having a throat with its open end facing rearwardly to receive the king pin, and a locking mechanism for locking the king pin in the throat of the hitch plate.

When backing up the towing unit, the driver often experiences difficulty in aligning the throat of the hitch plate with the king pin. For instance, the height of the king pin relative to the throat may be such that proper mating between the two will not be achieved, even though the two may be laterally aligned. In these instances, the front lower edge of the trailer may crash into the fifth wheel hitch plate (trailer and king pin too low) or the cab of the truck may crash into the body of the trailer (trailer and king pin too high). Alternatively, even though the king pin and fifth wheel hitch may appear coupled, if the king pin is not seated properly in the locking mechanism a "high couple" may result leading to an unsafe and potentially dangerous condition. On the other hand, even if the two components are at the proper engaging height relative to one another, the throat and the king pin may be laterally misaligned. In either case, positive coupling is not achieved, and the interlocking apparatus and/or the truck/trailer may be damaged or unsafe. Further, the problems attendant with this "guesswork" are exacerbated by the fact that the driver will often be faced with zero or low visibility conditions (night, severe weather, sleeper cab configurations, etc.)

As a result, systems have been developed to provide an output signal to the driver indicating the position of the truck relative to the trailer. Notably, known systems are targeted toward the "ball and hitch" coupling market and are not easily adaptable to the heavy trucking industry.

Known alignment systems use a variety of technologies to measure lateral offset and vertical alignment. Primarily, these systems utilize infrared sensor technology with a modulated pulsed beam. As such, these systems are limited in range (typically less than 20 feet) and require separate sets of infrared sensors on the towing and towed units, respectively, to indicate the lateral offset and vertical alignment. Also, because the infrared emitters and sensors are required on both the towing and towed units, the system must include a remote, powered transmitter on the towed unit. Clearly, these systems are limited in their application, inconvenient and relatively expensive.

In sum, current commercial truck/trailer coupling is performed relatively "blind" because direct observation of the king pin relative to the fifth wheel lock often is not possible. Further, systems such as air-bag suspensions lead to variable trailer and truck height, making positive coupling even more difficult. As a result, the operator relies on external reference points (trailer corner, tires, etc.) to achieve positive coupling. However, such practice often, as described above, leads to missed or incomplete or "hard coupling." These problems, and the damage often associated therewith, are worsened when the driver is faced with low visibility conditions due to cab design, darkness, weather, etc.

Therefore, the commercial trucking industry is in need of a coupling warning system that is contained in a single, relatively inexpensive unit and which is operational during varying environmental conditions. Such a system would minimize the problems associated with high or low coupling and lateral misalignment that leads to non-positive coupling and, would reduce the damage to the trailer, the truck, the fifth wheel hitch, etc.

SUMMARY OF THE INVENTION

The coupling alignment warning system (CAWS) of the instant invention is designed to provide the driver of a towing unit with visual and/or audible cues that indicate whether the towing unit is sufficiently aligned with the trailer to achieve positive coupling. In particular, the CAWS of the present invention is adapted to assist the driver in aligning and coupling the fifth wheel hitch of the towing unit, e.g., a commercial truck, with the king pin of the trailer. The CAWS is especially useful in assisting the driver with coupling the towing unit to the towed unit in zero or low visibility conditions.

To achieve these and other aspects of the invention, the CAWS combines laser technology with a reflective target to provide vertical and horizontal offset information. In particular, the CAWS includes a laser light source mounted on the towing unit and a retro-reflective target that is preferably installed on the front of the trailer. The light source and the target cooperate with a control circuit to determine whether the towing unit is aligned with the trailer so as to achieve positive coupling and, if not, to signal to the driver that the towed and/or towing unit need to be repositioned. To insure that the coupling components on the towing unit and the trailer properly engage each other when the system detects target acquisition, the user initially aligns the laser light source with the retro-reflective target to accommodate a range of allowed misalignment between the towing and towed units that still achieves positive coupling.

In operation, when the laser light source is activated, the laser beam emitted from the light source is directed toward the trailer in an attempt to "acquire" the retro-reflective target on the towed unit. When target acquisition has been achieved and, therefore, laser light is reflected back toward the laser light source, the reflected light impinges upon an array of sensors which surround the laser light source. Upon detecting reflected light, the sensors generate a detection signal and transmit that detection signal to a control circuit that determines whether positive coupling will occur and, thereafter, transmits an indicator signal that may be displayed to the user.

To minimize the chance of detecting a false signal, the system includes a spatial filter positioned adjacent the sensors to restrict the angles at which light may impinge upon the sensors. Also, to further minimize the chance of triggering on a false signal, photo-resistors having a peak sensitivity that is in tune with the wavelength of laser light are used. Both of these features make it less likely that off-axis light sources will trigger a positive coupling signal.

The control circuit includes a processor that is programmed to establish a threshold level of light based on the amount of ambient light detected by the system and continuously updates that threshold level to distinguish the reflected laser beam from the detected ambient light thereby insuring that the integrity of the CAWS output is maintained in varying ambient light conditions. If the sensed reflected laser light reaches the updated threshold level, the system will signal to the user that the towing unit is aligned with the trailer. More specifically, as the driver of the towing unit maneuvers the towing unit into alignment with the trailer, the CAWS will generate the indicator signal and transmit the indicator signal to the driver, preferably, via a display. If target acquisition has not been achieved or is subsequently lost, the driver will know from the display output that further maneuvering of the towing and/or towed units will be necessary to achieve proper coupling between the two.

The nature of the retro-reflective target is such that, when contacted by laser light, the target returns the laser light directly to its source regardless of impingement angle. The target is appropriately sized so that it will not return the laser light unless the fifth wheel hitch and the king pin are aligned for coupling. The size of the target preferably corresponds to the dimensions of the fifth wheel hitch which define the range of allowed misalignment between the towing and towed units. Therefore, the CAWS will indicate that positive coupling will occur even if the towed and towing units are not precisely aligned.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 3 is a simplified side view of a towing unit and towed unit having a coupling alignment warning system embodying the present invention showing initial alignment of the primary system components;

FIG. 4 is a simplified top view of a towing unit and towed unit having a coupling alignment warning system embodying the present invention showing initial alignment of the primary system components;

FIG. 8 is a simplified side view of the instant invention showing vertical misalignment between the towing unit and the towed unit;

FIG. 9 is a simplified top view of the instant invention showing lateral misalignment between the towing unit and the towed unit;

DETAILED DESCRIPTION OF PREFERRED EMBODIMENT

Figure 1:
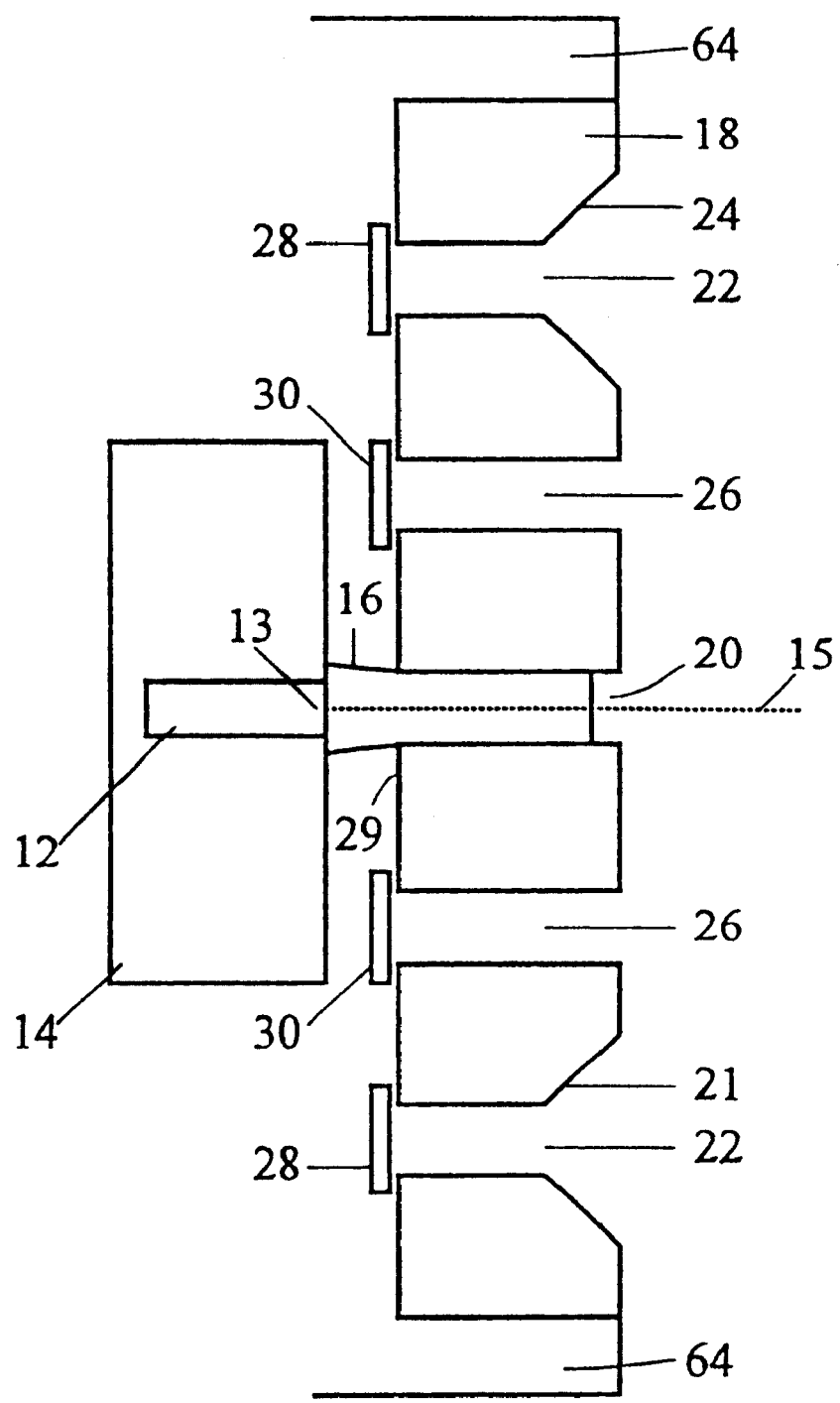
FIG. 1 is an enlarged top view of the transmitter/receiver components of a coupling alignment warning system embodying the present invention.

Referring in more detail to the drawings, FIG. 1 shows the transmitter/receiver components of the coupling alignment warning system (CAWS) 10 for aligning a towing unit with a towed unit by detecting ambient and reflected laser light in the system. In particular, the transmitter includes a laser light source 12 (preferably, a laser diode) that is mounted in an adjustable support 14 that is, in turn, attached to the interior of a rugged enclosure 64. In the preferred embodiment, rugged enclosure 64 is mounted to the towing unit during initial installation as described in more detail below (FIG. 3). The receiving components of the system, which are also shown in FIG. 1, include a spatial filter 18 and a series of sensors 28, 30. Spatial filter 18 has a series of optical tunnels 22, 26 that limit the amount of light that may reach both ambient sensors 28 and target sensors 30, that are positioned adjacent thereto, by restricting the angles at which light may impinge upon sensors 28, 30. Optical tunnels 22 (aligned with ambient sensors 28) have flared receiving ends 24 so that more ambient light may impinge upon ambient sensors 28 than on target sensors 30.

Spatial filter 18 also has a tunnel 20 that is aligned with light source 12 so that a collimated light beam 15 emitted from light source 12 is permitted to pass entirely through spatial filter 18. Sensors 28, 30 are mounted in the path of optical tunnels 22, 26, respectively, with target sensors 30 being positioned closest to the axis of the collimated light beam 15 emitted by laser light source 12. In operation, sensors 28, 30 detect the amount of light in the system including ambient light and, as described in more detail below, laser light that is reflected back towards target sensors 30 to determine whether target acquisition has been achieved. If it has, the CAWS provides continuous feedback to the user indicating that proper coupling will occur as long as alignment is maintained. If alignment is not maintained, the system will not detect reflected laser light and, therefore, will not provide the user with continuous positive coupling feedback, thus indicating to the user that either further maneuvering is necessary to couple the towing unit to the trailer, or that the user should inspect the system for a height adjustment.

To achieve target acquisition, laser light source 12 emits collimated light beam 15 that initially passes through a gun-barrel type tunnel 16 between an output end 13 of light source 12 and interior wall 29 of spatial filter 18. Tunnel 16 insures that collimated laser light beam 15 passes entirely into tunnel 20 of spatial filter 18 without reaching surrounding sensors 30, 28. In other words, tunnel 16 minimizes the chance that the system will detect a false signal. As described in more detail below, once target acquisition is achieved, i.e., laser light impinges upon the target, light beam 15 is at least partially reflected back toward spatial filter 18. Because in the preferred embodiment a retro-reflective target (described below) is used, the laser light is reflected directly back toward laser light source 12 and, therefore, principally impinges upon target sensors 30 (they being closer to the path of the laser light beam). The signals are thereafter processed (described below) and, if a sufficient amount of reflected laser light is detected, the CAWS will indicate that the towed and towing units are aligned for proper coupling. As long as the towing unit remains aligned with the towed unit, the system will indicate that positive coupling will occur without further lateral or height adjustment maneuvering by the user.

In the preferred embodiment, sensors 28, 30 are made from CdSe photo-resistors that have a peak sensitivity in tune with the wavelength of light beam 15 emitted by laser light source 12 (~655 nm). Further, spatial filter 18 is formed from an opaque, non-reflective medium that has a predetermined thickness; typically, the medium is black hard rubber or plastic that is approximately 0.75 inches thick. Therefore, spatial filter 18 minimizes the reflection of light impinging upon spatial filter 18 and minimizes the chance that other bright sources of light will generate false signals and, therefore, maximizes the chance that the system reliably identifies whether target acquisition has been achieved.

Figure 2:
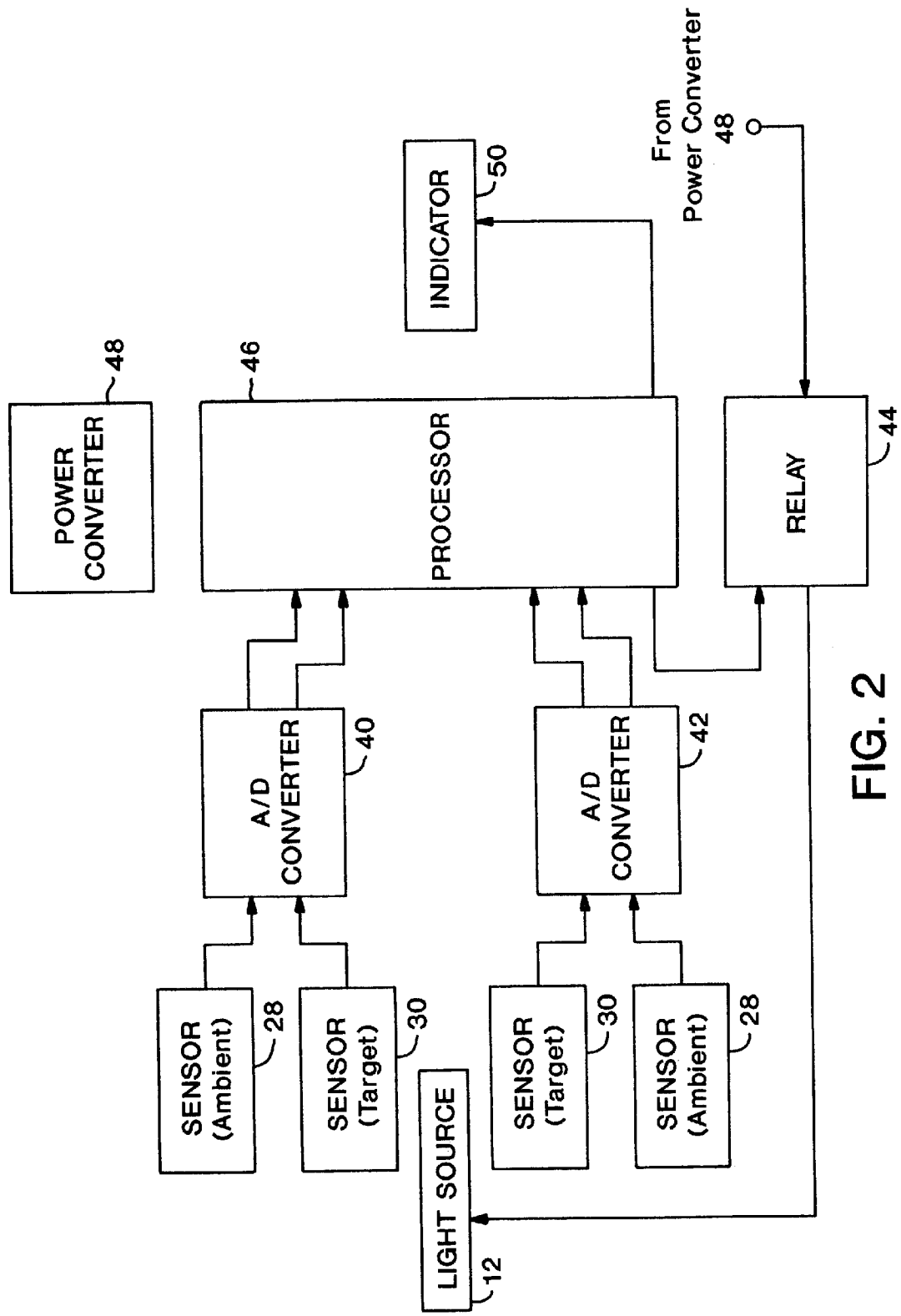
FIG. 2 is an electrical diagram in block form showing the primary signal processing components of the coupling alignment warning system.

Turning to FIG. 2, a block diagram illustrates the operation of the CAWS. Generally, after sensors 28, 30 detect the ambient light in the system, a control circuit 38 calculates a threshold level of light based on the detected level of ambient light. Thereafter, the CAWS determines whether the level of light detected by target sensors 30 reaches that threshold level. If so, control circuit 38 indicates to the user that reflected laser light is being received and that target acquisition has been achieved.

More particularly, when activated, power is supplied to the CAWS, preferably from the battery of the vehicle, through a power convertor 48. When laser light source 12 (which is controlled by a microprocessor through a relay, described below) is deactivated, ambient sensors 28 and target sensors 30 detect the amount of ambient light impinging upon sensors 28 and 30. In the preferred embodiment, the system includes two ambient sensors 28 and two target sensors 30, each pair being mounted equidistant from tunnel 20 of spatial filter 18 (FIG. 1). During detection of ambient light, sensors 28, 30 transmit analog output signals, preferably voltage signals, to separate analog-to-digital (A/D) convertors 40, 42. The voltage level of the analog output signals varies in response to the sensed level of illumination. Each A/D convertor has two inputs for receiving signals from sensors 28, 30. In the preferred embodiment, A/D convertors 40, 42 have twelve-bit resolution for converting the analog output signals to discrete values having a high degree of precision.

The discrete values from the A/D converters are then transmitted to a microprocessor 46 (preferably including EPROM technology for program control and data storage) which, in turn, calculates a threshold level of reflected laser light that must be detected before the CAWS will signal that target acquisition has been achieved (described in more detail below). After computing this threshold level, microprocessor 46 activates a relay 44 that allows power to be supplied to laser source 12. Laser source 12, preferably, a laser diode, then emits collimated laser light beam (15 in FIG. 1) that is directed toward a target on the towed unit and that is reflected back toward laser source 12 when properly aligned.

As the driver of the towing unit attempts to achieve positive coupling with the towed unit, sensors 28, 30 detect both ambient light and, upon target acquisition, reflected laser light. As described previously, more ambient light impinges upon ambient sensors 28 due to the corresponding flared ends 24 of optical tunnels 22, as best shown in FIG. 1. Further, more of the reflected laser light impinges upon target sensors 30 than ambient sensors 28 because the retro-reflective target returns light back to its source regardless of the angle of impingement (described below) and, thus, target sensors 30, which are positioned closer to the axis of laser light beam 15, receive more reflected laser light. Nevertheless, target sensors 30 do detect ambient light, so, as the ambient light levels increase, it becomes more difficult to distinguish the reflected laser light from the detected ambient light.

The CAWS 10 of the instant invention solves this problem by continually updating the threshold level of light based upon the most current level of sensed ambient light. When the driver is backing up the towing unit, microprocessor 46 periodically sends a signal to relay 44 which, as a result, deactivates the power supplied to laser source 12 for a predetermined amount of time; preferably, about one half of a second. During this time, the system reads all four sensors 28, 30 simultaneously which, necessarily, are only detecting ambient light. These signals are transmitted to A/D convertors 40, 42 and, thereafter, the digitized signals generated by A/D converters 40, 42 are transmitted to and processed by microprocessor 46 to establish a new threshold level. By periodically deactivating laser source 12 and establishing a new threshold level, the system can reliably indicate whether target acquisition has been achieved, even when the ambient light levels vary.

After each time the CAWS establishes a new threshold light level, microprocessor 46 activates laser light source 12, the CAWS reads sensors 28, 30 and determines whether the digitized signals from target sensors 30 reach this threshold level via a set of instructions programmed into microprocessor 46. Microprocessor 46 first processes the digitized target sensor signals and then determines whether the target sensor signal reaches the calculated threshold level and, if so, transmits an indicating signal to an indicator 50 which notifies the user that target acquisition is currently achieved. The indicator 50 could provide, for example, an LED display and/or an audio output of the indicator signal. In one embodiment, the LED display would remain illuminated as long as the CAWS detects reflected laser light. If the towing and towed units become misaligned, the sensors will no longer detect reflected laser light and the processor will deactivate the LED to signal to the driver that the towing and towed units need to be repositioned for positive coupling to occur.

Figure 7:
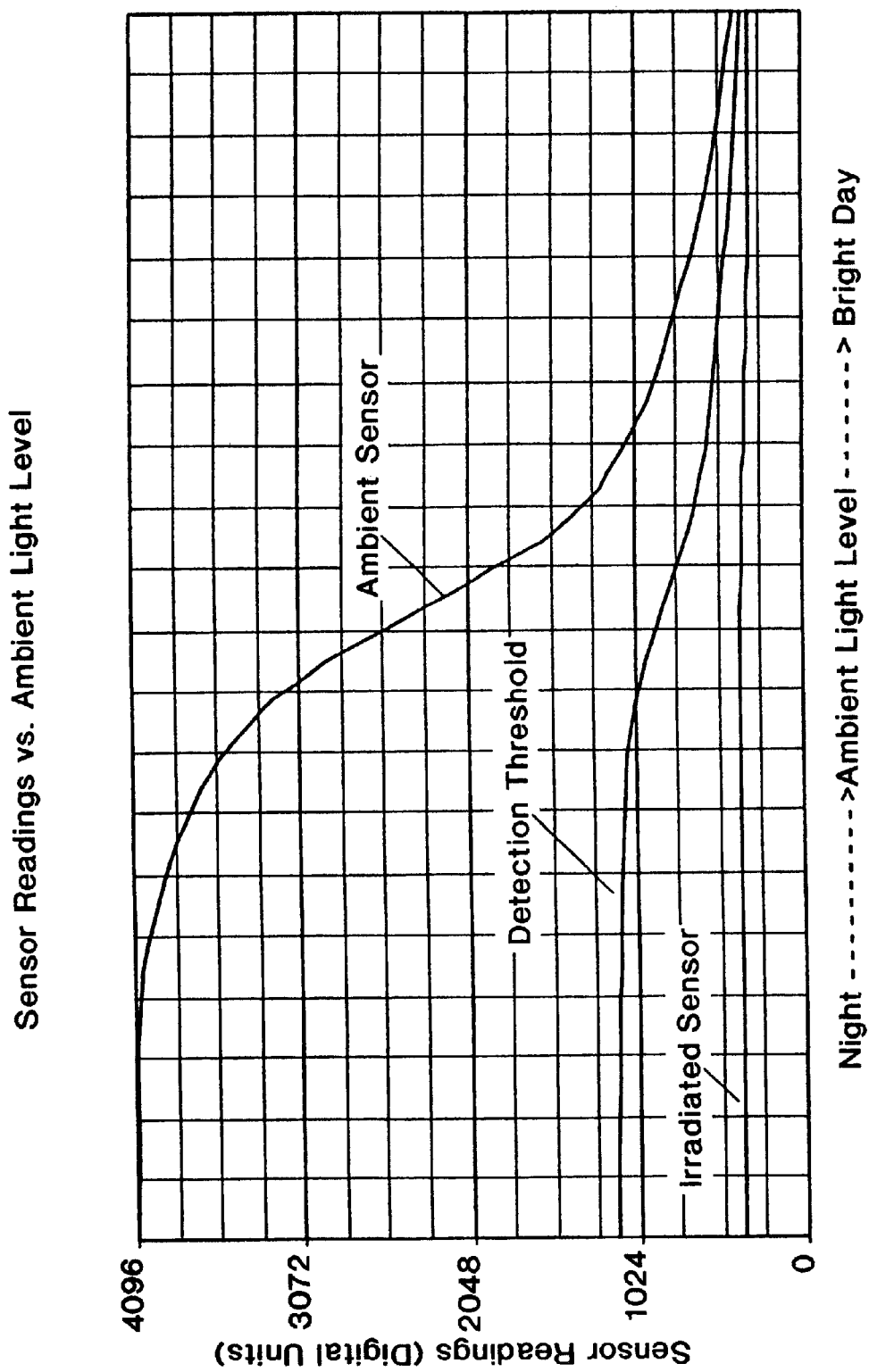
FIG. 7 is a graph of the desired relationship of the detected ambient light level and the threshold level established by the control circuit.

A graphical representation of the relationship between the detected ambient light level and the threshold level calculated by microprocessor 46, is shown in FIG. 7. Because photo-resistor sensors are used, the resistance of sensors 28, 30 is measured and the resistance levels (ambient, target and threshold) are plotted as a function of the amount of light detected by the system. As will be appreciated by those skilled in the art, the resistance levels of the sensors may be determined by passing a fixed current through the sensors and monitoring their voltage levels. Also, note that when progressively more light impinges upon the sensors, i.e., when the system is used in the daytime as opposed to night, the resistance of each sensor decreases.

As suggested above, the "threshold" curve designates the resistance level that the target sensors must reach before the CAWS indicates to the user that target acquisition has been achieved. At night, when the ambient light consists mainly of artificial light such as light emitted by headlights, the measured resistance of target sensors 30 (when target sensors are detecting reflected laser light) is significantly lower than the measured resistance of ambient sensors 28 since ambient sensors 28 receive very little light at all in such conditions. However, as the system is exposed to brighter ambient light, e.g., daytime, the measured resistance of ambient sensors 28 decreases dramatically, and approaches the measured resistance of target sensors 30 when target sensors 30 are receiving both reflected laser light and ambient light. As a result, it is much more difficult to determine whether target acquisition has been achieved during the daytime than at night and, therefore, the CAWS continually updates the threshold level to establish the greatest degree of distinguishability for varying ambient conditions.

By continually updating the threshold resistance level based on the amount of ambient light in the system and by incorporating relatively high resolution A/D convertors, microprocessor 46, which is programmed with instructions to calculate the threshold level based on the desired relationship shown in FIG. 7, determines whether the measured resistance of target sensors 30 reaches the calculated threshold level of resistance. If it does, microprocessor 46 transmits an indicating signal to indicator (50 in FIG. 2) thus notifying the user that target acquisition is currently achieved. Therefore, the CAWS is reliable regardless of the current amount of ambient light present during operation.

Referring next to FIGS. 3 and 4, a more detailed description of the initial set-up and operation of the CAWS 10 is shown. In FIGS. 3 and 4, initial alignment of the system on level ground is shown with the position determining components mounted on a towing unit 60 and a towed unit 62. The CAWS 10 includes a rugged enclosure 64 that contains the laser light source 12, sensors 28, 30 and the control circuit 38 (not shown in FIGS. 3 and 4), as well as a retro-reflective target 70 that together cooperate to send a signal to the driver that continuously indicates alignment of towing unit 60 relative to towed unit 62 as long as laser light impinges upon target 70.

FIGS. 3 and 4 also show a locking apparatus that is included on the towing and towed units 60, 62. In particular, towed unit 62 has what is commonly known in the commercial trucking industry as a king pin 74 that extends downwardly from a bottom surface 76 of towed unit 62. Further, towing unit 60 has what is known in the trucking industry as a fifth wheel hitch 78. Fifth wheel hitch 78 includes a hitch plate 80 having a throat 82 (FIG. 4) for receiving king pin 74 and which pitches about a mounting bracket 83 approximately at its center. Fifth wheel hitch 78 is mounted to a frame 79 of towing unit 60 (FIG. 4) such that an open end 86 of throat 82 faces rearwardly to receive and lock king pin 74 of towed unit 62 when the two are brought into engagement.

In the preferred embodiment, as shown in FIGS. 3 and 4, rugged enclosure 64 is mounted to a back wall 66 of towing unit 60, above the grease and contaminant area, so that light beam 15 emitted by laser light source 12 is directed generally perpendicular to wall 66 of towing unit 60. Further, rugged enclosure 64 is mounted at a height X defined by a top surface 84 of hitch plate 80 when hitch plate 80 is level and the axis of light beam 15 emitted from laser source 12, laser source 12 being mounted in rugged enclosure 64 as best shown in FIG. 3. Retro-reflective target 70 is mounted to a front vertical surface 68 of towed unit 62 at a height corresponding to the height X at which rugged enclosure 64 is installed. In particular, retro-reflective target 70 is attached to surface 68 at distance X defined by a bottom surface 76 of towed unit 62 (which is at the same height relative to the ground as top surface 84 of hitch plate 80 when coupled) and a bottom surface 72 of retro-reflective target 70, such that laser light beam 15 contacts bottom surface 72 of retro-reflective target 70 when towed unit 62 and towing unit 60 are on level ground, as shown in FIG. 3.

Light beam 15 is initially aligned so it strikes lower edge 72 and center of target 70 to accommodate the tolerance of allowed vertical misalignment (described below). Further, turning to FIG. 4, rugged enclosure 64 is mounted such that laser beam 15 is emitted perpendicularly from, in the preferred embodiment, the center of width of back wall 66 of towing unit 60, corresponding to the center axis of throat 82 of fifth wheel hitch 78. Retro-reflective target 70 is placed at the center of width of surface 68 of towed unit 62 which corresponds to the position of king pin 74, i.e., king pin 74 is likewise centered relative to the width of towed unit 62. Alternatively, the enclosure 64 and target 70 could be offset to accommodate alternate mounting on some trailers. Also, note that retro-reflective target 70 is, in the preferred embodiment, removably attached to towed unit 62 for ready installation and adaptability. For instance, target 70 may have a magnetic backing that makes attaching and aligning the CAWS at initial installation relatively effortless.

Alternately, rather than measuring the height X to initially align the components of the CAWS, towed unit 62 could first be coupled to towing unit 60 and, thereafter, the user could adjust the position of retro-reflective target 70 with respect to rugged enclosure 64 to achieve the alignment shown in FIGS. 3 and 4. The user would activate the CAWS and position enclosure 64 and target 70 so that the axis of light beam 15 is directed at the center of bottom surface 72 of target 70 when towing unit 60 and towed unit 62 are on level ground. This latter approach to initial installation and alignment is particularly useful in the trucking industry because users can simply perform one coupling operation, align rugged enclosure 64 with retro-reflective target 70, and then simply install rugged enclosure 64 and retro-reflective target 70 on the remainder of their fleet of towed and towing units corresponding to the position of these elements at initial alignment.

The specific characteristics of retro-reflective target 70 are preferably exploited during the operation of the CAWS 10. The nature of retro-reflective target 70 is such that, when laser light from laser source 12 impinges upon it, the target returns the laser light directly to source 12 regardless of impingement angle. Target 70 has an array of closely spaced miniature corner cube reflectors, each of which contains three walls that are mutually perpendicular for reflecting light back to its source. Also, to insure that all the light that impinges on the cube reflector returns to the laser light source 12, the surface of each cube reflector is made of a highly reflective material. Therefore, by positioning target sensors 30 close to the axis of laser light source 12 and reading these sensors, the CAWS can reliably determine whether target acquisition is currently achieved. Note that, in the preferred embodiment, retro-reflective target 70 corrects for off-angle coupling approaches within a range of ±45°. Commercially available retro-reflective targets which offer acceptable performance include Model BRT-2×2 by Banner Engineering Corp. and Model UZZ112 from Nais Aromat Corp.

Figure 5:
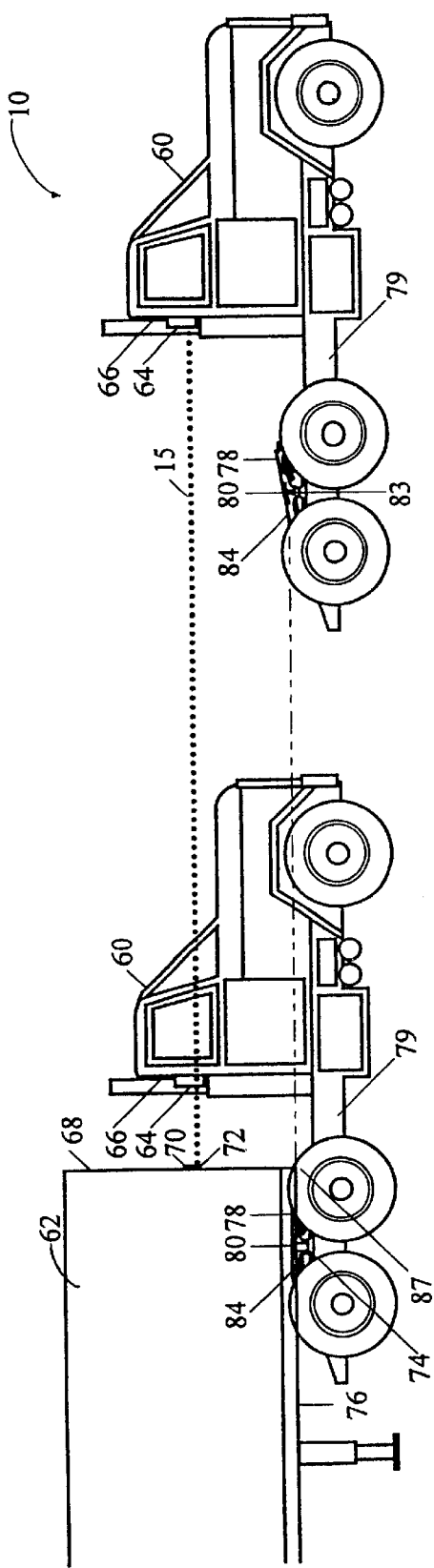
FIG. 5 is a simplified side view of a towing unit and towed unit having a coupling alignment warning system showing the vertical tolerance of the system.
Figure 6:
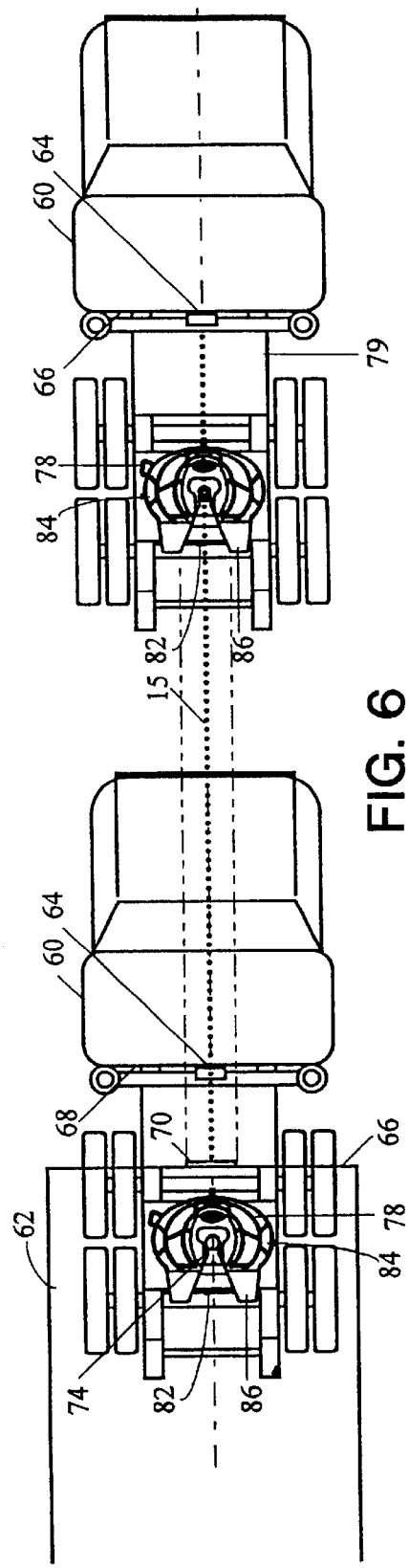
FIG. 6 is a simplified top view of a towing unit and towed unit having a coupling alignment warning system showing the lateral tolerance of the system.

Although the locking apparatus will not couple if king pin 74 does not enter throat 82 of fifth wheel hitch 78, an amount of misalignment is allowed between towing unit 60 and towed unit 62 while still achieving positive coupling. The lateral misalignment tolerance is defined by the dimensions of fifth wheel hitch 78 and, more particularly, the dimensions of open end 86 of throat 82 of fifth wheel hitch 78. The vertical misalignment tolerance is defined by the maximum height that the ramps (not shown) on the open end 86 of throat 82 can safely engage the lower front edge 87 of towed unit 62 and "lift" said towed unit to the proper height during the coupling action (FIG. 3). As best shown in FIGS. 5 and 6, in the preferred embodiment, retro-reflective target 70 is rectangular having dimensions that are approximately four inches high by twelve inches wide corresponding to the dimensions of the opening of throat 82 of fifth-wheel hitch 78 and king pin 74. When laser light beam 15 is impinging upon retro-reflective target 70, the CAWS senses target acquisition and, as the driver backs up towing unit 60, bottom surface 76 of towed unit 62 will contact the top surface 84 of hitch plate 80 and king pin 74 will enter throat 82 to couple fifth wheel hitch 78 and king pin 74. If the height of towed unit 62 is lower than that shown in FIG. 5, the CAWS 10 will continue to indicate proper alignment as long as the height of towed unit 62 is not more than four inches below the initial, and ideal, height that is shown in FIG. 5. If towed unit 62 is more than four inches below the height shown in FIG. 5, surface 68 of towed unit 62 may crash into outwardly facing open end 86 of hitch plate 80.

Figure 10:
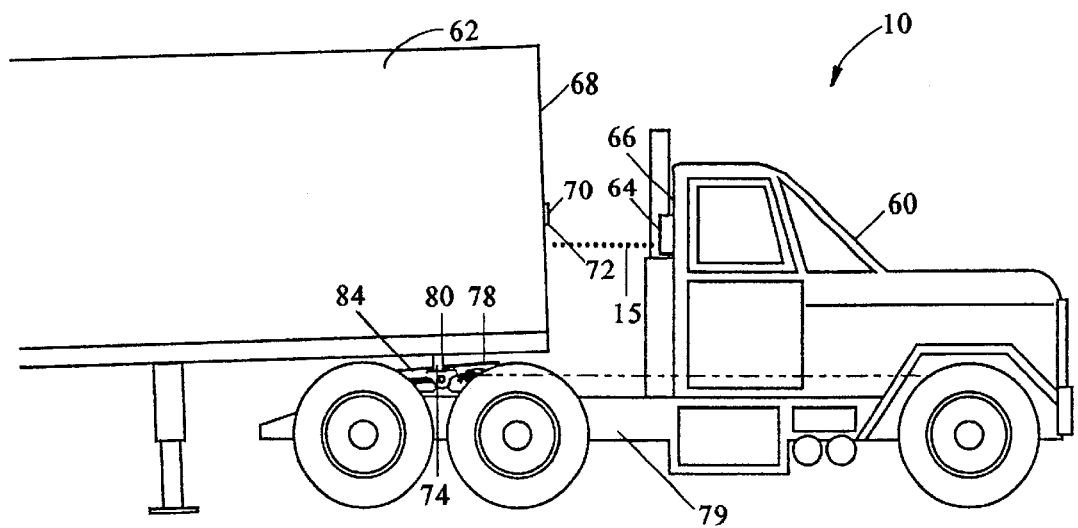
FIG. 10 is a simplified top view similar to FIG. 8 showing vertical misalignment between the towing unit and the towed unit.

The instant invention accounts for this potential fault condition by utilizing a retro-reflective target that is four inches high. If towed unit 62 and, necessarily, retro-reflective target 70 attached thereto is lower than four inches below what it is in initial alignment, laser light beam 15 will not impinge upon retro-reflective target 70 and no laser light will be reflected back toward rugged enclosure 64. Thus, the CAWS 10 will not detect reflected laser light and will indicate to the user that target acquisition has not been achieved, i.e., that positive coupling will not occur without repositioning the towing and/or towed units. Similarly, if towed unit 62 is at a height (relative to towing unit 60) that is higher than it was at initial alignment, or if towing unit 60, and more specifically, laser light beam 15, is at a lower height than it is at initial alignment, king pin 74 will be too high to engage throat 82 of fifth wheel hitch 78 and positive coupling cannot occur (FIG. 10). In this case, as shown in FIGS. 8 and 10, no laser light will contact retro-reflective target 70 and the system will appropriately indicate that target acquisition has not been achieved.

Figure 11:
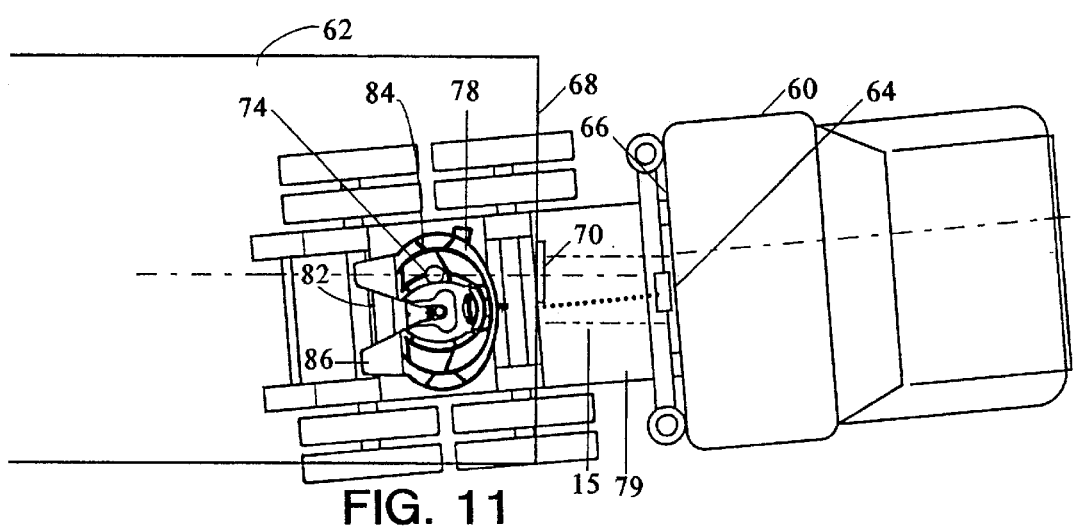
FIG. 11 is a simplified top view similar to FIG. 9 showing lateral misalignment between the towing unit and the towed unit.

Further as best shown in FIG. 6, the CAWS 10 will tolerate a twelve inch range of lateral misalignment. Because laser source 12 mounted in rugged enclosure 64 is initially aligned so that laser light beam 15 strikes the center of retro-reflective target 70 and because retro-reflective target 70 is twelve inches wide, the system will signal to the user that towing unit 60 will be unable to couple to towed unit 62 if the approach that the driver of towing unit 60 takes is more than six inches, in either lateral direction, off the center line of initial alignment (shown in FIG. 4). As depicted in FIGS. 9 and 11, if the driver's approach is more than six inches off the center line of initial alignment, light beam 15 will not reflect off of retro-reflective target 70 and, therefore, retro-reflective target 70 will not redirect any laser light back toward rugged enclosure 64. Sensors 28, 30 will not detect reflected laser light and the system will properly indicate to the user that target acquisition has not been achieved. Clearly, if the approach then taken is continued, positive coupling will not occur and damage to the components could result. In operation, the CAWS provides this position information continuously so that the user has sufficient time to correct any misalignment between the towed and towing units.

Figure 12:
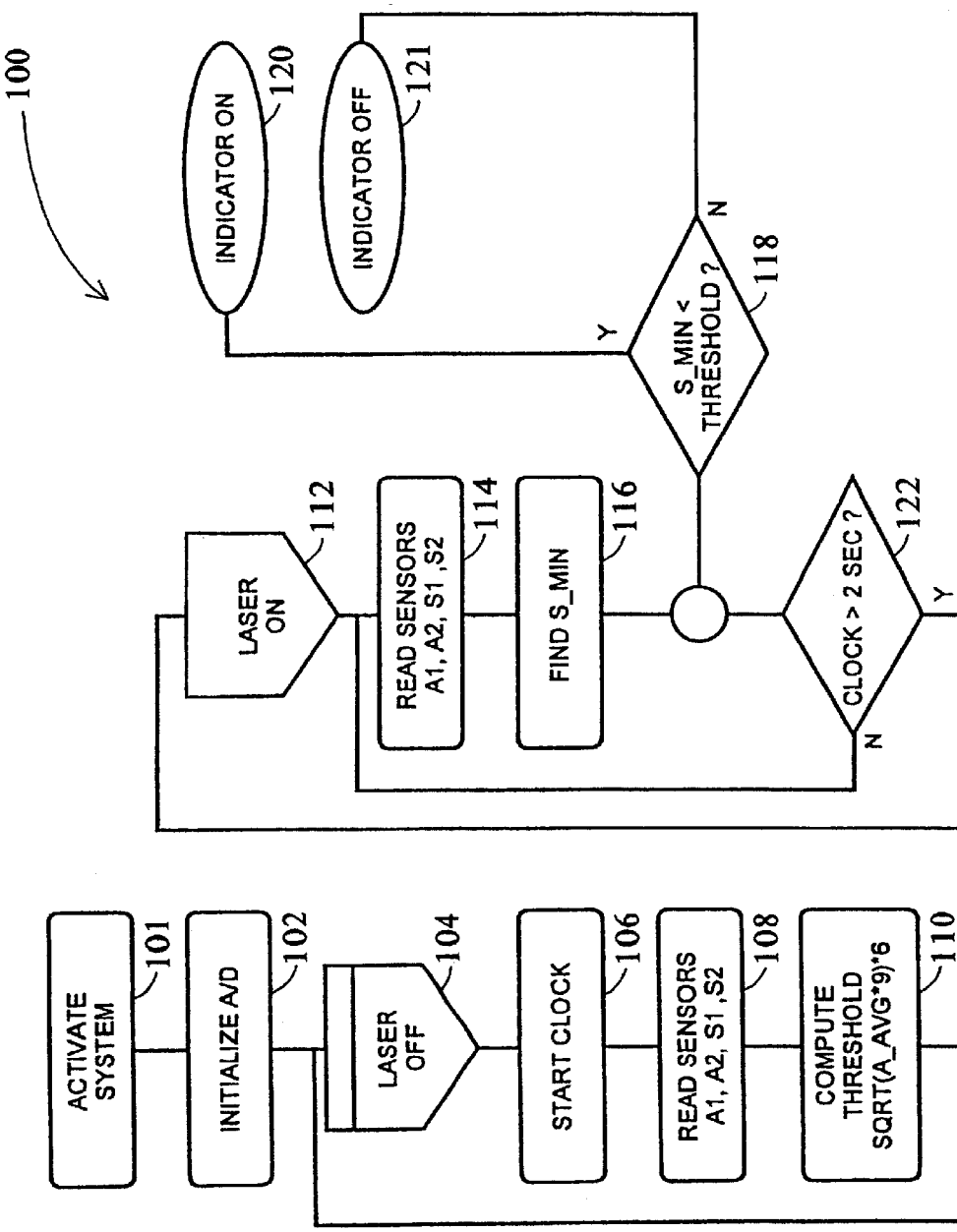
FIG. 12 is a block diagram depicting the operation of the coupling alignment warning system.

The operation of the system is depicted in FIG. 12 which shows that, in the preferred embodiment, when the system 100 is activated (step 101), the analog-to-digital convertors are initialized (step 102) while the laser light source is off (step 104). Then, the microprocessor clock signal is started (step 106) and the sensors, ambient and target, are read (step 108), digitized and electrically coupled to the processor for computation of the threshold level (step 110) based on the amount of ambient light in the system (described above). Next, the laser light source is activated (step 112) and the sensors are continuously read (step 114) as the driver attempts to couple the towing unit with the towed unit. The sensor signals are digitized by the analog-to-digital convertors, and then coupled to the processor which, computes a value, S_MIN (step 116), that is compared with the computed threshold level (step 118). In the preferred embodiment (as described above), if S_MIN is less than the computed threshold level, a positive coupling signal (step 120) is sent to the indicator, and if not, the indicator remains off (step 121). The system repeats this process as the driver of the towing unit attempts to achieve positive coupling. Further, each time S_MIN is established based on the entered readings, the processor asks whether the clock signal is greater than two seconds (step 122), and, if so, computes a new threshold level based on the then current amount of ambient light in the system.

In a further embodiment of the present invention, the laser light source could be mounted on the towing unit so that it is capable of multi-dimension tracking of the position of the towed unit by, for example, mounting laser light source 12 on a gimbal system. In such a system, the laser could maintain target acquisition even when the relative height between the towed and towing units varies, e.g., when backing up on a hill. In addition, the system could be adapted for scanning the retro-reflective target laterally and/or vertically, therefore tracking the position of the towing unit relative to the towed unit in two dimensions. The measured azimuth and elevation angles could be transmitted to the user via the display unit to further assist in maneuvering the towing unit for proper alignment with the towed unit.

Also, in another embodiment, the detected light signals could be processed by a wave band filter tuned to pass only light having a wavelength corresponding to the emitted laser light. If the filter passes a signal, the system necessarily must be detecting reflected laser light and, therefore, will indicate to the user that target acquisition has been achieved. Alternatively, by modulating the laser light beam with bits of data and, thereafter, processing the detected light signals to determine whether the data is present, the system can indicate to the user whether reflected laser light has been sensed and, therefore, whether target acquisition has been achieved.

The entire system may draw its operating power from the towing unit power supply, typically a 12-volt battery. In addition, although the indicator is preferably mounted to the exterior mirror of the towing unit, it may also be mounted within the cab or any convenient place in which it may be monitored by the operator of the vehicle. Also note that the CAWS may be manually activated by the user or, alternatively, the system may be activated by certain vehicle operations. For instance, the system could be adapted to sense when the towing unit is in reverse and, in response, activate the CAWS. To deactivate the CAWS, the system could be used in conjunction with the fifth wheel hitch coupling control system disclosed in U.S. Pat. No. 5,861,802 which includes a lock sensor for detecting when a locking mechanism of a trailer hitch assembly is locked. The disclosure of U.S. Pat. No. 5,861,802 is incorporated herein by reference. By interfacing the CAWS with the invention of U.S. Pat. No. 5,861,802, activation/deactivation of the CAWS may be automatically controlled; for example, when the lock sensor detects that the fifth wheel hitch is locked to the king pin, the lock sensor signal could be utilized to deactivate the CAWS.

Other applications of the alignment system of the instant invention have also been contemplated. For instance, employers in the heavy trucking industry could use the system as a training device for beginning drivers and to provide guidance to drivers who otherwise would be merely "eyeballing" the coupling operation, often a difficult task even for experienced drivers. By training new drivers with the help of the instant invention, employers will minimize the chance that the new drivers will damage their equipment, thus significantly reducing the overall cost of training. Also, by utilizing the data storage capabilities of the processor, the system could be used as a type of "black box" in the event that an accident does occur, i.e., employers will be able to determine whether their drivers heeded the signals of the CAWS system. For instance, the CAWS could be used in conjunction with the coupling control system of the above-referenced U.S. Pat. no. 5,861,802 to record additional feedback information as the driver attempts to achieve positive coupling. The proximity sensing capabilities of the U.S. Pat. No. 5,861,802 could be utilized to signal the microprocessor 46 to begin recording position data within a predetermined range, preferably near coupling. By analyzing the recorded data, users will be able to determine whether the driver maneuvered the towing unit in response to a CAWS signal that indicated that the towing unit was aligned with the towed unit.

Further, the present invention could be used to align the back of a trailer with a loading dock. And, the CAWS could be used in various other transportation alignment applications. For example, the retro-reflective target could be mounted in a boat docking station, with the primary system components mounted on the boat, for assisting the driver with parking the boat.

Unlike previous systems, the system of the instant invention may be retrofit to any vehicle/trailer combination. And, because a minimum number of components is necessary, the overall cost of manufacture is relatively low.

The above description is considered that of the preferred embodiment only. Modifications of the invention will occur to those skilled in the art and to those who make or use the invention. Therefore, it is understood that the embodiment shown in the drawings and described above are merely for illustrative purposes and not intended to limit the scope of the invention, which is defined by the following claims as interpreted according to the principles of patent law, including the doctrine of equivalents.

The invention claimed is:

1. An alignment indicating system for coupling a towed unit to a towing unit comprising:

a light source for emitting a beam of light, said light source being attached to the towing unit;

at least one sensor adapted to be attached to the towing unit for receiving ambient light and for generating a first output signal representing a sensed ambient light level, and for receiving a light beam transmitted from the towed unit and for generating a second output signal representing the intensity of the received light beam;

a processing circuit for receiving the first and second output signals and generating an indicator signal; and an indicator responsive to the indicator signal for notifying the user whether the towing unit is aligned with the towed unit, wherein said processing circuit computes a threshold level of light from the first output signal, compares the level of the second output signal with the threshold level, and generates the indicator signal when the level of the second output signal reaches the threshold level to signify whether the towing unit is aligned with the towed unit.

2. The alignment indicating system according to claim 1, wherein said processing circuit is coupled to said light source for periodically deactivating said light source for a predetermined time period, said processing circuit calculates the threshold level based on second output signals received from said sensor during the predetermined time period.

3. An alignment indicating system for coupling a towed unit to a towing unit comprising:

a light source for emitting a beam of light, said light source being attached to the towing unit;

at least one sensor attached to the towing unit for receiving light and for generating a detection signal;

a control circuit that receives the detection signal and generates an indicator signal in response to the detection signal, wherein said control circuit is coupled to said light source for periodically deactivating said light source for a predetermined time period, said control circuit calculates a threshold light level based on detection signals from said sensor during the predetermined time period and determines whether the towing unit is aligned with the towed unit based on the threshold light level and the detection signals received when said light source is activated; and an indicator responsive to said indicator signal for signifying whether the towing unit is aligned with the towed unit.

4. An alignment warning system for coupling a towed unit to a towing unit comprising:

a light source for emitting a beam of light, said light source being attached to the towing unit, wherein said light source generates a collimated light beam that is projected rearwardly from the towing unit;

at least one sensor attached to the towing unit for receiving light and for generating a detection signal;

a control circuit that receives the detection signal and generates an indicator signal in response to the detection signal; and an indicator responsive to said indicator signal for signifying whether the towing unit is aligned with the towed unit.

5. The alignment warning system according to claim 4, wherein said light source is a laser diode.

6. The alignment warning system according to claim 4, wherein said at least one sensor receives ambient light and a light beam transmitted from the towed unit.

7. The alignment warning system according to claim 6, wherein said at least one sensor includes a plurality of sensors arranged in an array for receiving light and for generating a corresponding plurality of detection signals.

8. The alignment warning system according to claim 7, wherein said control circuit includes a processor for processing the detection signals and for generating the indicator signal and transmitting the indicator signal to said indicator.

9. The alignment warning system according to claim 8, wherein said control circuit further includes at least one analog to digital converter electrically coupled to said plurality of sensors for digitizing said plurality of detection signals and transmitting said digitized detection signals to said processor for processing the digitized detection signals and for generating the indicator signal.

10. The alignment warning system according to claim 9, wherein said processor is programmed to calculate a threshold light level based on the plurality of digitized detection signals.

11. The alignment warning system according to claim 10, wherein said control circuit further includes a relay for activating said light source.

12. The alignment warning system according to claim 11, wherein said processor controls said relay.

13. The alignment warning system according to claim 12, wherein said processor is programmed to periodically signal said relay to deactivate said light source for a predetermined time period and to calculate the threshold light level based on the plurality of digitized detection signals during the predetermined time period.

14. The alignment warning system according to claim 13, wherein at least one of said sensors is a target sensor provided proximate said light source to detect said light beam transmitted from the towed unit and to generate a detection signal.

15. The alignment warning system according to claim 14, wherein said processor is programmed to determine whether the towing unit is aligned with the towed unit based on the threshold light level and the detection signal.

16. The alignment warning system according to claim 15, wherein said processor stores data pertaining to the position of the towed unit relative to the towing unit as the operator attempts to align the towing unit with the towed unit.

17. The alignment warning system according to claim 6, and further including a reflective target adapted to be removably attached to the towed unit for reflecting the light beam emitted from said light source back to the towing unit.

18. The alignment warning system according to claim 17, wherein the light beam transmitted from the towed unit is said reflected light beam.

19. The alignment warning system according to claim 18, wherein said reflector is a corner cube reflector.

20. The alignment warning system according to claim 19, wherein the alignment warning system indicates that the towed unit will couple with the towing unit over a range of lateral and vertical misalignment.

21. The alignment warning system according to claim 20, wherein said reflective target has dimensions corresponding to said range of lateral and vertical misalignment.

22. The alignment warning system according to claim 21, wherein said range of lateral and vertical misalignment is about twelve inches laterally by about four inches vertically.

23. The alignment warning system according to claim 4, wherein said at least one sensor is a photo-resistor sensor.

24. The alignment warning system according to claim 23, wherein said photo-resistor sensor is a CdSe photo-resistor sensor.

25. The alignment warning system according to claim 4, wherein said indicator includes a display.

26. The alignment warning system according to claim 25, wherein said indicator receives said indicator signal from said control circuit, and displays whether the towing unit is aligned with the towed unit.

27. An alignment warning system for coupling a towed unit to a towing unit comprising:
    a light source for emitting a beam of light, said light source being attached to the towing unit;
    at least one sensor attached to the towing unit for receiving light and for generating a detection signal:
    a spatial filter positioned adjacent said at least one sensor for restricting the angles at which light may impinge upon said at least one sensors;
    a control circuit that receives the detection signal and generates an indicator signal in response to the detection signal; and
    an indicator responsive to said indicator signal for signifying whether the towing unit is aligned with the towed unit.

28. The alignment warning system according to claim 27, wherein said light source generates a collimated light beam.

29. The alignment warning system according to claim 27, wherein said spatial filter has a predetermined thickness and has a first surface, a second surface, and at least one tunnel extending entirely through said first surface and said second surface.

30. The alignment warning system according to claim 29, wherein said at least one tunnel has an opening, said opening being flared for increasing the angles at which light may impinge on said at least one sensor.

31. The alignment warning system according to claim 27, wherein said spatial filter is made from an opaque non-reflective material.

32. The alignment warning system according to claim 27, wherein said light source and said at least one sensor are mounted in an enclosure that is attached to the towing unit.

33. The alignment warning system according to claim 32, wherein said spatial filter is mounted in said enclosure.

34. The alignment warning system according to claim 33, wherein said light source is mounted in an adjustable support adapted for calibration and initial alignment of said light source, said adjustable support being mounted in said enclosure.

35. An alignment warning system for coupling a trailer to a towing unit comprising:
    a light source for emitting a beam of light, said light source adapted to be attached to the towing unit;
    a retro-reflective target adapted to be mounted to the trailer for reflecting the light beam back toward the towing unit when the light beam impinges on said retro-reflective target;
    at least one sensor adapted to be attached to the towing unit for receiving the reflected light beam and for generating an output signal that indicates that the reflected light beam is being received; and
    an indicator responsive to the output signal generated by said at least one sensor for indicating whether the towing unit is aligned with the trailer.

36. The alignment warning system according to claim 35 further comprising:
    a spatial filter positioned adjacent said at least one sensor for restricting the angles at which light may impinge upon said at least one sensor.

37. The alignment warning system according to claim 35, wherein said retro-reflective target has a top edge and a bottom edge and is adapted to be removably attached to the trailer.

38. The alignment warning system according to claim 35, wherein said retro-reflective target contains a magnetic surface for attaching said retro-reflective target to the trailer.

39. The alignment warning system according to claim 35, wherein said light source is attached to the towing unit so that the light beam emitted from said light source is aligned with the throat of a fifth wheel hitch of the towing unit.

40. The alignment warning system according to claim 37, wherein said retro-reflective target is attached to the trailer so that, at initial alignment, the light beam emitted from said light source impinges upon the center of the bottom edge of said retro-reflective target.

41. The alignment warning system according to claim 40, wherein said light source is a laser diode.

42. The alignment warning system according to claim 35, wherein the alignment warning system indicates that the towed unit will couple with the towing unit over a range of lateral and vertical misalignment.

43. The alignment warning system according to claim 42, wherein said reflective target has dimensions corresponding to said range of lateral and vertical misalignment.

44. The alignment warning system according to claim 43, wherein said range of lateral and vertical misalignment is about twelve inches laterally by about four inches vertically.

45. An alignment warning system for coupling a trailer to a towing unit comprising:

a laser diode for emitting a laser light beam, said laser diode adapted to be attached to the towing unit;

a retro-reflective target adapted to be mounted to the trailer for reflecting the laser beam back toward the towing unit when the light beam impinges on said target;

at least one ambient sensor adapted to be attached to the towing unit for receiving ambient light and for generating a first output signal;

at least one target sensor adapted to be attached to the towing unit for receiving the reflected laser beam and for generating a second output signal;

a processing circuit for receiving the first and second output signals and generating an indicator signal; and an indicator responsive to the indicator signal for notifying the user whether the towing unit is aligned with the trailer;

wherein said processing circuit computes a threshold level of light from the first output signal, compares the level of the second output signal with the threshold level, and generates the indicator signal when the level of the second output signal reaches the threshold level to signify whether the towing unit is aligned with the trailer.

46. An alignment warning system according to claim 45, wherein said processing circuit further includes a relay controlled by a microprocessor for periodically deactivating said laser diode for a predetermined time, thus allowing said microprocessor to update said threshold level of light during the predetermined time.

47. An alignment warning system for aligning a moving unit with a stationary unit comprising:

a light source for emitting a beam of light, said light source adapted to be attached to the moving unit;

a reflective target adapted to be removably attached to the stationary unit for reflecting the light beam back toward the moving unit when the light beam impinges on said reflective target, wherein said light beam only impinges upon said reflective target when the moving unit and the stationary unit are aligned for proper coupling;

at least one sensor adapted to be attached to the moving unit for receiving the reflected light beam and for generating an output signal;

a processing unit that receives the output signal and generates an indicator signal when a level of the output signal indicates that the reflected light beam is being received; and an indicator responsive to the indicator signal for indicating whether the moving unit is aligned with the stationary unit.

* * * * *

UNITED STATES PATENT AND TRADEMARK OFFICE
CERTIFICATE OF CORRECTION

PATENT NO. : 6,252,497 B1
DATED : June 26, 2001
INVENTOR(S) : Steven C. Dupay et al.

It is certified that error appears in the above-identified patent and that said Letters Patent is hereby corrected as shown below:

Column 14,
Line 16, "sensors" should be -- sensor --.

Signed and Sealed this

Eleventh Day of December, 2001

Attest:

NICHOLAS P. GODICI
Attesting Officer  Acting Director of the United States Patent and Trademark Office